(12) United States Patent
Raviv et al.

(10) Patent No.: US 9,348,537 B2
(45) Date of Patent: May 24, 2016

(54) ASCERTAINING COMMAND COMPLETION IN FLASH MEMORIES

(71) Applicant: QUALCOMM Incorporated, San Diego, CA (US)

(72) Inventors: Dolev Raviv, Kiryat-Yam (IL); Tatyana Brokhman, Kiryat Ata (IL); Maya Haim, Haifa (IL); Assaf Shacham, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 14/467,404

(22) Filed: Aug. 25, 2014

(65) Prior Publication Data

US 2015/0074338 A1    Mar. 12, 2015

Related U.S. Application Data

(60) Provisional application No. 61/875,907, filed on Sep. 10, 2013.

(51) Int. Cl.
*G06F 3/06* (2006.01)
*G06F 13/38* (2006.01)

(52) U.S. Cl.
CPC ............ *G06F 3/0659* (2013.01); *G06F 3/0619* (2013.01); *G06F 3/0679* (2013.01); *G06F 13/385* (2013.01); *G06F 2206/1014* (2013.01)

(58) Field of Classification Search
CPC ... G06F 3/0659; G06F 3/0619; G06F 3/0679; G06F 13/385
USPC ......................................... 711/103, 154, 156
See application file for complete search history.

(56) References Cited

U.S. PATENT DOCUMENTS

| 3,783,255 | A | * | 1/1974 | Buedel | ............... | H04Q 3/54591 714/31 |
| 5,870,758 | A | * | 2/1999 | Bamford | ........... | G06F 17/30362 |
| 6,275,876 | B1 | * | 8/2001 | Valk | ..................... | G06F 13/126 710/19 |
| 6,341,367 | B1 | * | 1/2002 | Downing | ............. | G05B 19/045 326/46 |
| 6,353,845 | B1 | * | 3/2002 | Torzewski | ............. | G06F 9/4843 710/6 |
| 6,434,637 | B1 | * | 8/2002 | D'Errico | ............... | G06F 3/0647 710/15 |
| 6,587,893 | B1 | | 7/2003 | Wickeraad | | |
| 7,219,178 | B2 | * | 5/2007 | Harris | ................... | G06F 13/364 710/110 |
| 7,328,304 | B2 | * | 2/2008 | Royer, Jr. | ............... | B82Y 10/00 711/103 |
| 7,373,450 | B2 | * | 5/2008 | Kamegawa | ......... | G06F 13/4022 710/110 |
| 7,512,746 | B2 | * | 3/2009 | Matsunami | ........... | G06F 3/0605 711/114 |

(Continued)

OTHER PUBLICATIONS

Written Opinion of the International Preliminary Examining Authority for PCT/US2014/052667, mailed Aug. 19, 2015, 5 pages.

(Continued)

*Primary Examiner* — Stephen Elmore
(74) *Attorney, Agent, or Firm* — Withrow & Terranova, PLLC

(57) ABSTRACT

Ascertaining command completion in flash memories is disclosed. An exemplary aspect includes eliminating the software lock and the outstanding requests variable and replacing them with a transfer request completion register. The transfer request completion register may be mapped to the universal flash storage (UFS) Transfer Protocol (UTP) Transfer Request List (UTRL) slots. The controller of the host—a hardware component—may set the bit in the transfer request completion register on transfer request completion at the same time the doorbell register is cleared. After this bit has been read, the bit in the transfer request completion register is cleared.

26 Claims, 7 Drawing Sheets

(56) References Cited

U.S. PATENT DOCUMENTS

| | | | | |
|---|---|---|---|---|
| 7,558,895 B2* | 7/2009 | Bruce | G06F 13/364 | 710/110 |
| 7,587,543 B2* | 9/2009 | Genova | G06F 13/4031 | 710/200 |
| 7,657,682 B2* | 2/2010 | Pagan | G06F 13/362 | 370/230 |
| 8,156,273 B2* | 4/2012 | Moran | G06F 13/362 | 326/38 |
| 8,301,832 B1* | 10/2012 | Moore | G06F 3/061 | 711/103 |
| 8,341,342 B1* | 12/2012 | Bonwick | G06F 11/1076 | 711/103 |
| 8,370,567 B1* | 2/2013 | Bonwick | G06F 3/0688 | 711/103 |
| 8,549,204 B2* | 10/2013 | Meyers | G06F 13/4226 | 710/17 |
| 8,601,191 B2* | 12/2013 | Aoki | G06F 13/366 | 710/110 |
| 8,677,068 B2* | 3/2014 | Canepa | G06F 3/0683 | 711/114 |
| 8,700,834 B2* | 4/2014 | Horn | G06F 13/16 | 710/107 |
| 2006/0075169 A1* | 4/2006 | Harris | G06F 13/364 | 710/110 |
| 2006/0235999 A1 | 10/2006 | Shah et al. | | |
| 2014/0189212 A1* | 7/2014 | Slaight | G06F 12/0866 | 711/103 |

OTHER PUBLICATIONS

International Search Report and Written Opinion for PCT/US2014/052667, mailed Nov. 13, 2014, 9 pages.

Author Unknown, "Universal Flash Storage (UFS) Host Controller Interface," JEDEC Standard No. 223A, JEDEC Solid State Technology Association, Jun. 2012, Arlington, Virginia, 58 pages.

Notification Concerning Informal Communications with the Applicant for PCT/US2014/052667, mailed Nov. 5, 2015, 3 pages.

International Preliminary Report on Patentability for PCT/US2014/052667, mailed Nov. 11, 2015, 16 pages.

* cited by examiner

ASCERTAINING COMMAND COMPLETION IN FLASH MEMORIES

PRIORITY CLAIM

The present application claims priority to U.S. Provisional Patent Application Ser. No. 61/875,907 filed on Sep. 10, 2013, and entitled "SYSTEMS AND METHODS FOR ASCERTAINING COMMAND COMPLETION IN FLASH MEMORY," which is incorporated herein by reference in its entirety.

BACKGROUND

I. Field of the Disclosure

The technology of the disclosure relates generally to flash memory and processing commands for flash memory.

II. Background

Flash memory is common in many sorts of computing devices including mobile terminals such as cameras, audio players, smart phones, tablets, and the like. Flash memory may be one of two general types—removable or embedded—and several standards exist for both general types. One standard initially designed for embedded situations is the Universal Flash Storage (UFS) standard set forth by the Joint Electron Device Engineering Council (JEDEC). Another common standard is the embedded Multi-Media Controller (eMMC) standard.

In the UFS standard, a host communicates with a device that holds the memory elements. The host issues commands to the device to execute "transfer request" tasks such as writing data into the memory elements, reading data from the memory elements, and synchronize cache. By design, UFS supports multiple concurrent transfer requests. The transfer requests are software driven at the controller of the host and use a register called a doorbell register and a software variable referred to (at least within a LINUX implementation) as an outstanding requests variable. While the term "outstanding requests variable" is specific to LINUX, other operating systems use similar variables and all are referred to herein as outstanding requests variables. Each transfer request occupies a slot and a corresponding bit in the doorbell register and the outstanding requests variable. When sending a new transfer request, software sets a bit corresponding to the slot in the register and the variable. Setting the bit in the register notifies the controller that a new transfer request is ready. When a transfer request is completed, the hardware clears the bit corresponding to the slot in the register, and software then compares the bit in the register to the bits in the outstanding requests variable to find completed requests. Note that eMMC is similar, although the particular elements may have different names.

If the host receives an interrupt before setting the doorbell register and after updating the outstanding requests variable, the host may recognize that the request is completed before the request was sent. In such a situation, the software may complete the request, but with an error. Alternatively, if the host receives an interrupt after setting the register and the request was completed before updating the outstanding requests variable, the request may be lost. Still another situation may delay requests until another transfer request completion interrupt arrives. Such situation either delays the request, thereby causing performance degradation, causes the delay to last indefinitely, or until an error occurs which aborts the command. Currently, such situations are avoided through the use of a software lock. However, such software locks are slow and may exclude other transfer requests. Further, such software locks or exclusions generally increase latency resulting in a degradation of performance, especially in multi-core processors.

SUMMARY OF THE DISCLOSURE

Aspects disclosed in the detailed description include ascertaining command completion in flash memories. An exemplary aspect includes eliminating the software lock and the outstanding requests variable and replacing them with a transfer request completion register. The transfer request completion register may be mapped to the universal flash storage (UFS) Transfer Protocol (UTP) Transfer Request List (UTRL) slots. The controller of the host—a hardware component—may set the bit in the transfer request completion register on transfer request completion at the same time the doorbell register is cleared. After this bit has been read, the bit in the transfer request completion register is cleared. While UFS is specifically contemplated, other flash memory standards such as embedded Multi-Media Controller (eMMC) also may benefit from aspects of the present disclosure (e.g., eMMC has a Task Descriptor List (TDL) that is functionally equivalent to the UTRL). Replacing the software lock and the outstanding requests variable improves performance by reducing latency and eliminating the transfer request exclusions that may occur with the use of such software locks. In particular, completion and issuing contexts can work simultaneously. Transfer requests may be issued from multiple contexts at the same time. The use of these multiple contexts improves performance, especially in multi-core devices such as smart phones.

In this regard in one aspect, a UFS system is disclosed. The UFS system includes a doorbell register having a number of bits corresponding to a UTRL. The UFS system also comprises a completion register having a same number of bits. The UFS system further comprises a control system operatively coupled to the doorbell register and the completion register. The control system is configured to set a doorbell bit in the doorbell register for a send request start. Stated another way, when a bit in the doorbell register is raised, it signals the controller that a transfer request is ready and can be processed (i.e., start transferring the data). The control system is also configured to set a completion bit in the completion register on transfer request completion. The control system is also configured to clear the doorbell bit on transfer request completion.

In another aspect, a memory system is disclosed. The memory system includes a doorbell register having a number of bits. The memory system also includes a completion register having a same number of bits. The memory system also includes a control system operatively coupled to the doorbell register and the completion register. The control system is configured to set a doorbell bit in the doorbell register for a send request start. The control system is also configured to set a completion bit in the completion register on transfer request completion. The control system is also configured to clear the doorbell bit on transfer request completion.

In another aspect, a method of controlling a memory system is disclosed. The method includes generating a transfer request in a host. The method also includes setting a bit in a doorbell register in the host identifying the transfer request. The method also includes passing the transfer request to a device through a communications interface. The method also includes completing a transfer associated with the transfer request. The method also includes clearing the bit in the doorbell register. The method also includes setting a completion bit in a completion register.

In another aspect, an embedded Multi-Media Controller (eMMC) memory system is disclosed. The memory system includes a doorbell register having a number of bits corresponding to an eMMC task descriptor list. The memory system also includes a completion notification register having a same number of bits. The memory system also includes a control system operatively coupled to the doorbell register and the completion notification register and configured to set a doorbell bit in the doorbell register for a send request start. The control system is also configured to set a completion bit in the completion notification register on transfer request completion. The control system is also configured to clear the doorbell bit on transfer request completion.

DETAILED DESCRIPTION

Figure 1:
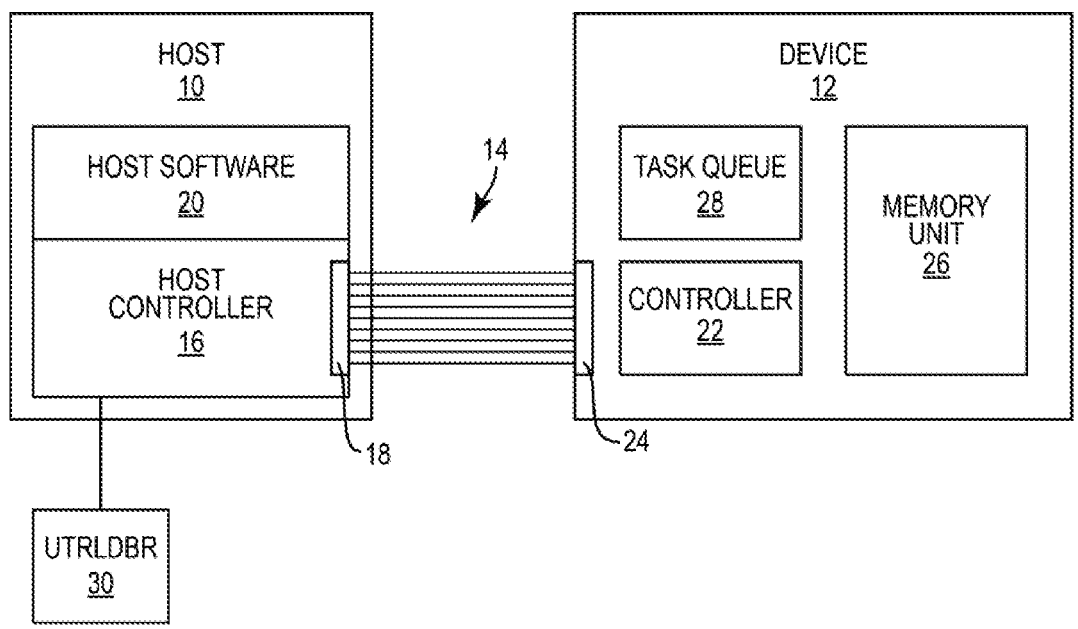
FIG. 1 is a block diagram of an exemplary connection between a host and a device without exemplary aspects of the present disclosure.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include ascertaining command completion in flash memories. An exemplary aspect includes eliminating the software lock and the outstanding requests variable and replacing them with a transfer request completion register. The transfer request completion register may be mapped to the universal flash storage (UFS) Transfer Protocol (UTP) Transfer Request List (UTRL) slots. The controller of the host—a hardware component—may set the bit in the transfer request completion register on transfer request completion at the same time the doorbell register is cleared. After this bit has been read, the bit in the transfer request completion register is cleared. While UFS is specifically contemplated, other flash memory standards such as embedded Multi-Media Controller (eMMC) also may benefit from aspects of the present disclosure (e.g., eMMC has a Task Descriptor List (TDL) that is functionally equivalent to the UTRL). Replacing the software lock and the outstanding requests variable improves performance by reducing latency and eliminating the transfer request exclusions that may occur with the use of such software locks. In particular, completion and issuing contexts can work simultaneously. Transfer requests may be issued from multiple contexts at the same time. The use of these multiple contexts improves performance, especially in multi-core devices such as smart phones.

Figure 2A:
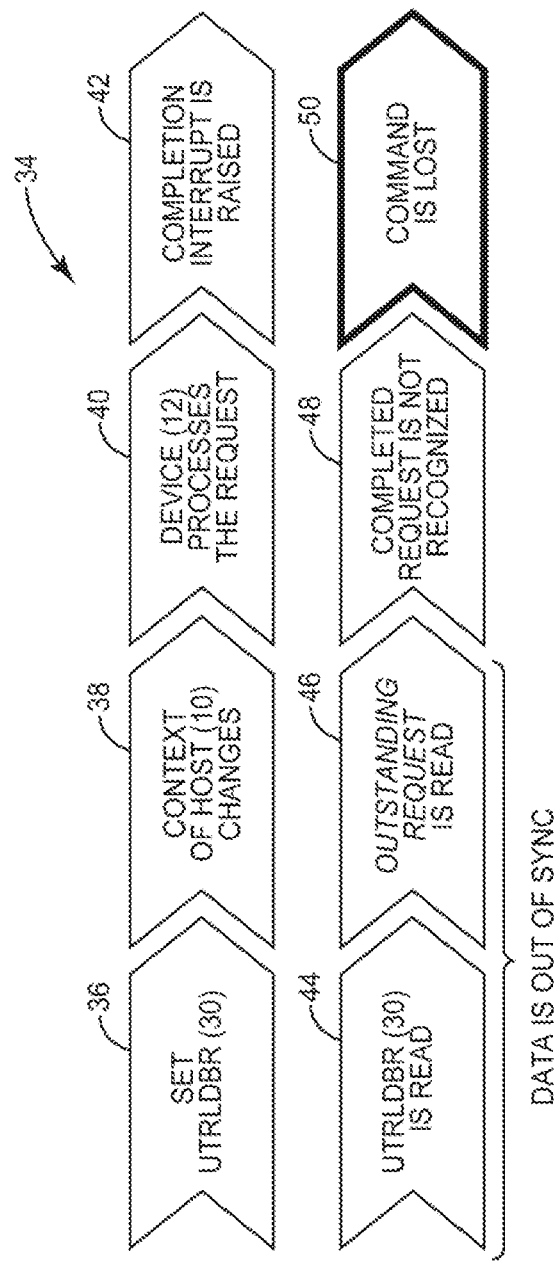
FIG. 2A illustrates a first race condition that may arise in a memory system without synchronization locks or aspects of the present disclosure.
Figure 2B:
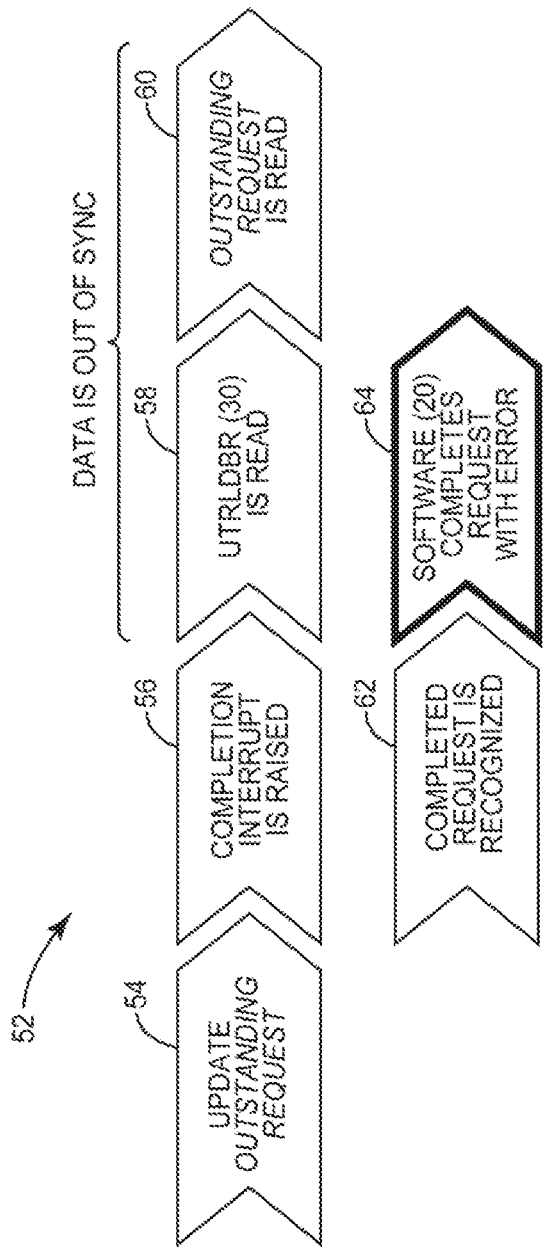
FIG. 2B illustrates a second race condition that may arise in a memory system without synchronization locks or aspects of the present disclosure.
Figure 3:
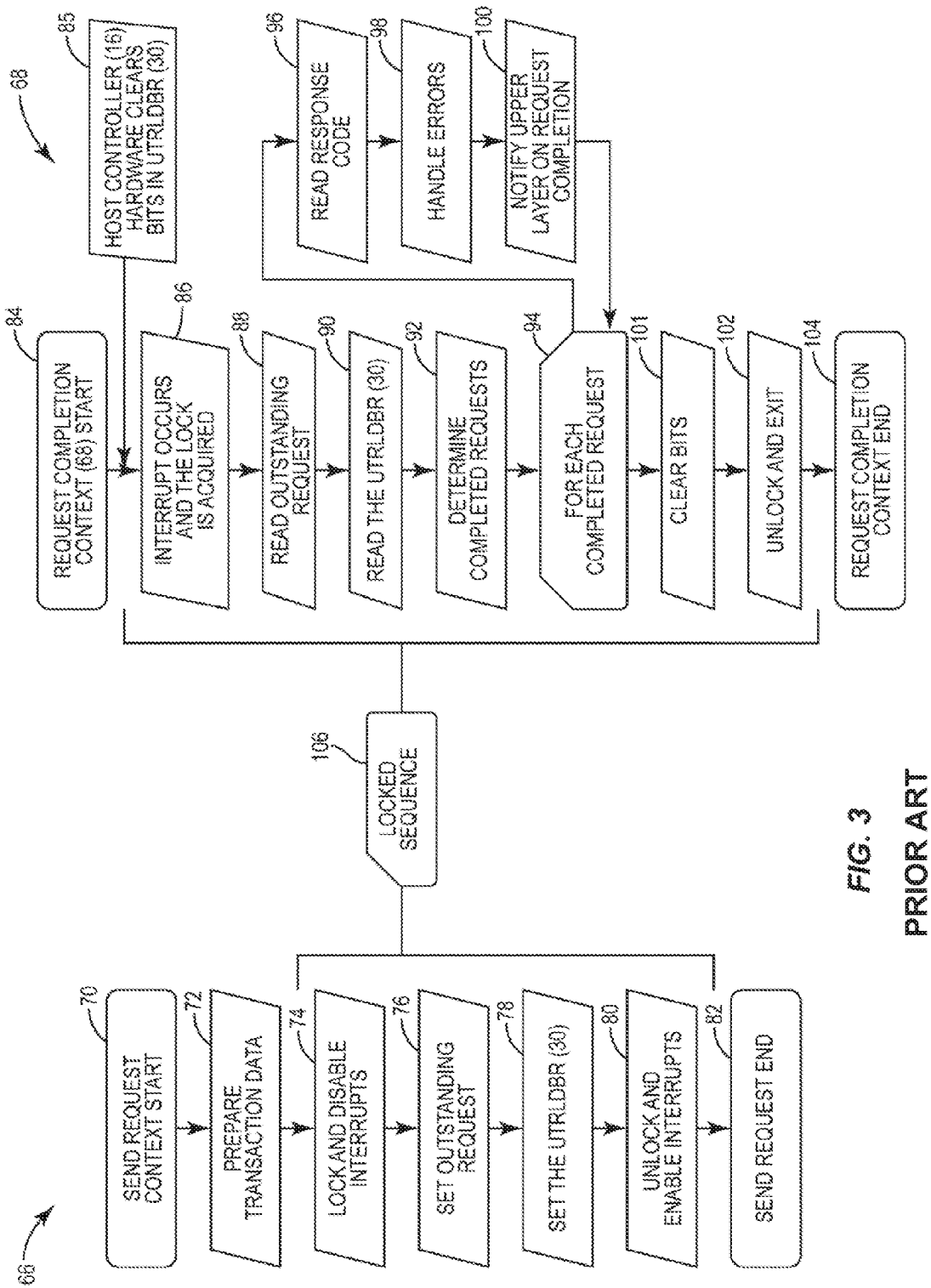
FIG. 3 illustrates a flow chart of a conventional data flow process using a lock to prevent race conditions such as those illustrated in FIGS. 2A and 2B.

Before addressing aspects of the present disclosure, an overview of conventional systems and issues that arise therewith is presented with reference to FIGS. 1-3. Exemplary aspects of the present disclosure begin below with reference to FIG. 4.

In this regard, FIG. 1 is block diagram of a host 10 coupled to a device 12 via conductors 14. The communications between host 10 and device 12 conform to the UFS v2.0 standard published September 2013. While the present discussion focuses on UFS, other flash standards may also benefit from aspects of the present disclosure including embedded Multi-Media Controller (eMMC). The host 10 includes a host controller 16 that is a hardware based system operatively coupled to an appropriate communication interface 18. Host controller 16 interoperates with host software 20. Collectively, the host controller 16 and host software 20 are a control system.

With continued reference to FIG. 1, the device 12 includes a controller 22 that is a hardware based system operatively coupled to an appropriate communication interface 24. The device 12 further includes a memory unit 26 (e.g., a Negated AND or NOT AND (NAND) Flash storage device). The device 12 further includes a task queue 28. Collectively, the controller 22 and any software associated with the operation of the controller 22 are a control system.

Host 10 further includes a doorbell register 30 (UTRLDBR). The doorbell register 30 is a hardware based component with a number of bits equal to a number of transfer request slots handled by the host controller 16. That is, the doorbell register 30 has a number of bits corresponding to a UFS standard Protocol Transfer Request list.

With continued reference to FIG. 1, in a conventional UFS system, the computing element incorporating the host 10 may need to read or write data to the memory unit 26. Accordingly, a transfer request that outlines the data transfer requested may be sent to the host controller 16. The host software 20 then assigns a slot to the transfer request. The host controller 16 may have multiple slots (not shown) to handle multiple transfer requests. Multiple transfer requests are common, especially in multicore processors. When the host software 20 has prepared the transfer request for the device 12, the host software 20 sets a bit in the doorbell register 30 corresponding to the slot with which the transfer request is associated. Setting the bit in the doorbell register 30 signals to the host controller 16 to send the transfer request to the device 12 through the communication interface 18.

The device 12 handles the transfer request according to well documented rules within the UFS standard. The data transfer occurs, and once the data transfer is completed, the host controller 16 notifies the host software 20 by clearing the bit in the doorbell register 30. In operation, the host 10 may receive a transfer request interrupt. The host software 20 checks the doorbell register 30 to see which tasks are finished and which slots are already assigned. However, absent more information, the host software 20 cannot discriminate between bits set to zero for completed tasks and bits set to zero for a request that has not yet been sent. Accordingly, the host software 20 maintains an outstanding requests variable (not shown), which indicates which slots have been assigned.

The outstanding requests variable is updated once preparations to send a transfer request have begun and cleared once the response for transfer request is received from the device 12. The host software 20 compares the outstanding requests variable with the doorbell register 30 to know which slots have completed requests. Absent further control, the UFS system may have race conditions which cause errors, delays, aborted commands, or the loss of commands. Two such race conditions are illustrated in FIGS. 2A and 2B.

In this regard, FIG. 2A illustrates, through a process 34, what happens when a send request stops running before the outstanding requests variable is updated. It should be appreciated that process 34 may be implemented by different elements including software and hardware and may be separate and distinct components (e.g., different sub-routines, different software modules, different IC, or the like). In particular, and as stated above, when the host software 20 of FIG. 1 has prepared the transfer request for the device 12, the host software 20 sets a bit in the doorbell register 30 (block 36) corresponding to the slot with which the transfer request is associated. The context of the host 10 changes (block 38) corresponding to the host 10 processing some other transfer request or processing some incoming data. Device 12 processes the transfer request (block 40). The device 12 may need some time to process the transfer request. While the device 12 is processing the transfer request, a context switch, sending the 'send command process' to sleep may occur. When the device 12 completes the transfer request, the device 12 sends a completed task notification. The host 10 then raises a completion interrupt (block 42). At this point, because the context changed, the outstanding requests variable was never updated. Thus, at the completion interrupt, the host 10 checks the doorbell register 30 (block 44) and reads the outstanding requests variable (block 46). However, as noted above, the outstanding requests variable was not updated and thus, the completed request is not recognized (block 48) and the command is aborted or timed out (block 50).

Similarly, FIG. 2B illustrates a process 52 where the updating of the outstanding requests variable occurs before updating the doorbell register 30 (the opposite of the order described above and done to avoid the race condition set forth in process 34). It should be appreciated that process 52 may be implemented by different elements including software and hardware and may be separate and distinct components (e.g., different sub-routines, different software modules, different IC, or the like). However, process 52 gives rise to another race condition (i.e., two processes are competing for the same resource) where the command is completed, but with errors. In particular, the process 52 begins at the point in time where the outstanding requests variable is updated (block 54). A completion interrupt for another transfer request is raised (block 56). However, the interrupt occurs before updating the doorbell register 30. Thus, when the doorbell register 30 is read (block 58), the bit is not set. However, when the outstanding requests variable is read (block 60), the host software 20 sees the transfer request and recognizes a completed request (block 62). Thus, the host software 20 will complete the request, but with an error (block 64).

Conventional systems prevent these race conditions through the use of a software lock. Software locks increase latency. In the interest of completeness, FIG. 3 illustrates the flow processes associated with a send request context 66 and a request completion context 68. The process associated with send request context 66 begins with a send request context start (block 70). The host 10 prepares the transaction data (block 72). The host software 20 then sets a lock and disables interrupts (block 74). The software sets the outstanding requests variable (block 76) and then the doorbell register 30 is set (block 78). After the doorbell register 30 is set, the lock is disabled and interrupts enabled (block 80). After the lock is removed, the send request context ends (block 82).

With continued reference to FIG. 3, the request completion context 68 starts (block 84). The host controller 16 clears the bit(s) in the doorbell register 30 (block 85). The request completion interrupt occurs and a lock is created by the host software 20 (block 86). The host 10 reads the outstanding requests variable (block 88) in the host software 20. The host 10 then reads the doorbell register 30 (block 90) and determines completed requests with reference to the doorbell register 30 and the outstanding requests variable (block 92). For each completed request (block 94), a subroutine is performed wherein the response code is read (block 96), any errors are handled (block 98) and an upper layer (e.g., the software that issued the request in the first instance) is notified of the request completion (block 100). When all completed requests have been processed at block 94, the outstanding requests variable's corresponding bits are cleared (block 101), and then the host software 20 removes the lock and exits (block 102) resulting in the end of the request completion context (block 104). The existence of the locks in both send request context 66 and request completion context 68 is highlighted by the designation locked sequence (block 106).

Figure 4:
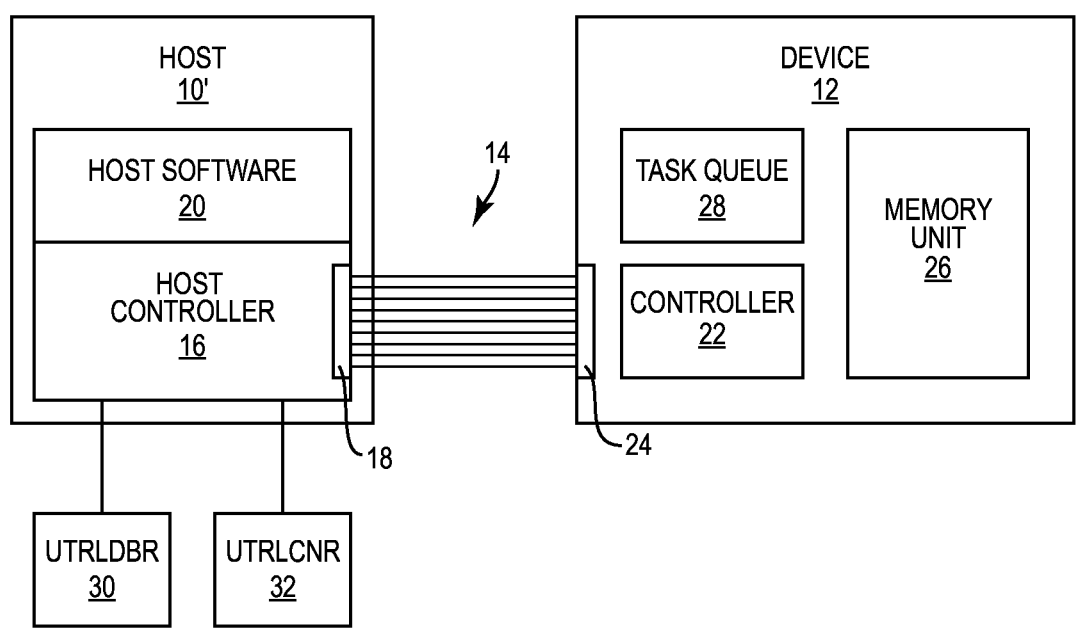
FIG. 4 is a block diagram of an exemplary connection between a host and a device with host registers according to exemplary aspects of the present disclosure.

In contrast to the processes of send request context 66 and request completion context 68, aspects of the present disclosure allow the elimination of the lock, and the attendant disadvantages are alleviated. In this regard, FIG. 4 illustrates a host 10' that includes a command completion register (UTRLCNR) 32 (also sometimes referred to as a completion notification register). Note that in most other requests host 10' has elements identical to host 10 of FIG. 1. As with doorbell register 30, the command completion register 32 is hardware based and has a number of bits equal to a number of slots handled by the host controller 16. That is, use of the command completion register 32 allows a hardware solution instead of the locks. By use of the hardware solution, sending and completion of requests can start at any point. The ability to have multiple contexts operating concurrently improves the operating efficiencies, especially for multi-core processors.

Figure 5:
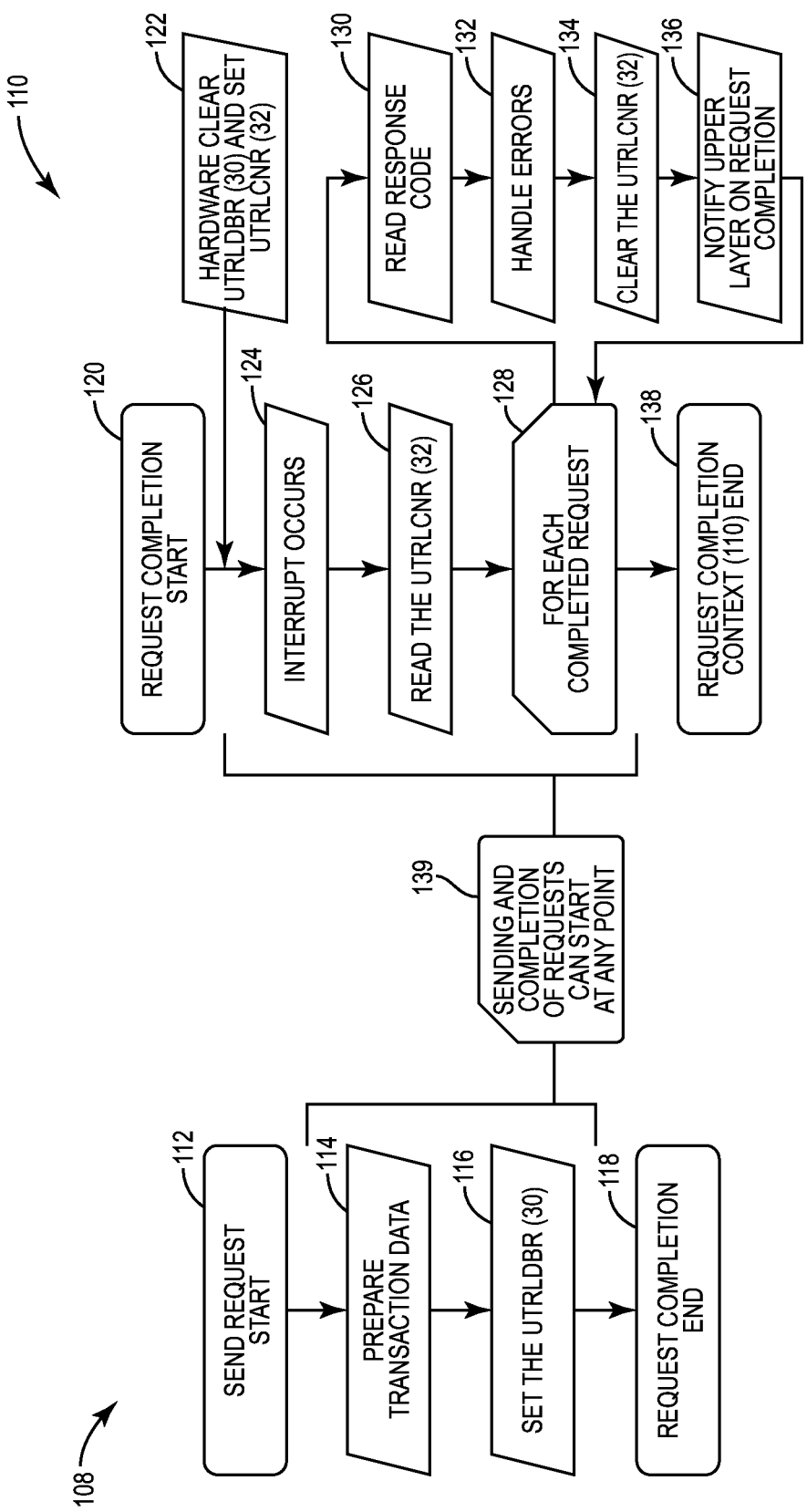
FIG. 5 is a flowchart illustrating an exemplary process of data flow between the host and device of FIG. 4.

In this regard, FIG. 5 provides send request context 108 and request completion context 110. Send request context 108 starts (block 112) and the host software 20 prepares the transaction data (block 114). The host software 20 sets the doorbell register 30 (block 116) and the send request ends (block 118). Because there is no need to set the software variable for the outstanding requests, there is no concern about an interrupt occurring.

With continued reference to FIG. 5, the request completion context 110 starts (block 120). Initially, the hardware clears the doorbell register 30 and sets the command completion register 32 (block 122). An interrupt occurs (block 124). The host software 20 reads the command completion register 32 (block 126) to ascertain what tasks are completed. For each completed task, a subroutine begins (block 128) where the response code is read (block 130), any errors are handled (block 132) and the host software 20 clears the command completion register 32 (block 134). After the host software 20 clears the command completion register 32, an upper layer (e.g., the software that issued the request) is notified of the request completion (block 136). After clearing and notification, the slot in the command completion register 32 corresponding to the bit may be reversed as needed or defined. When all completed requests have been processed (block 128), the request completion context 110 ends (block 138). In contrast to the time period when the lock disables interrupts (highlighted by 106 in FIG. 3), block 139 highlights that the interrupts can occur at any point, and in particular may occur during the times that the conventional systems impose the lock. As noted above, elimination of the lock improves performance and the addition of the new hardware (i.e., the command completion register 32) is viewed as an acceptable tradeoff for the improved performance.

Ascertaining command completion in flash memories according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 6:
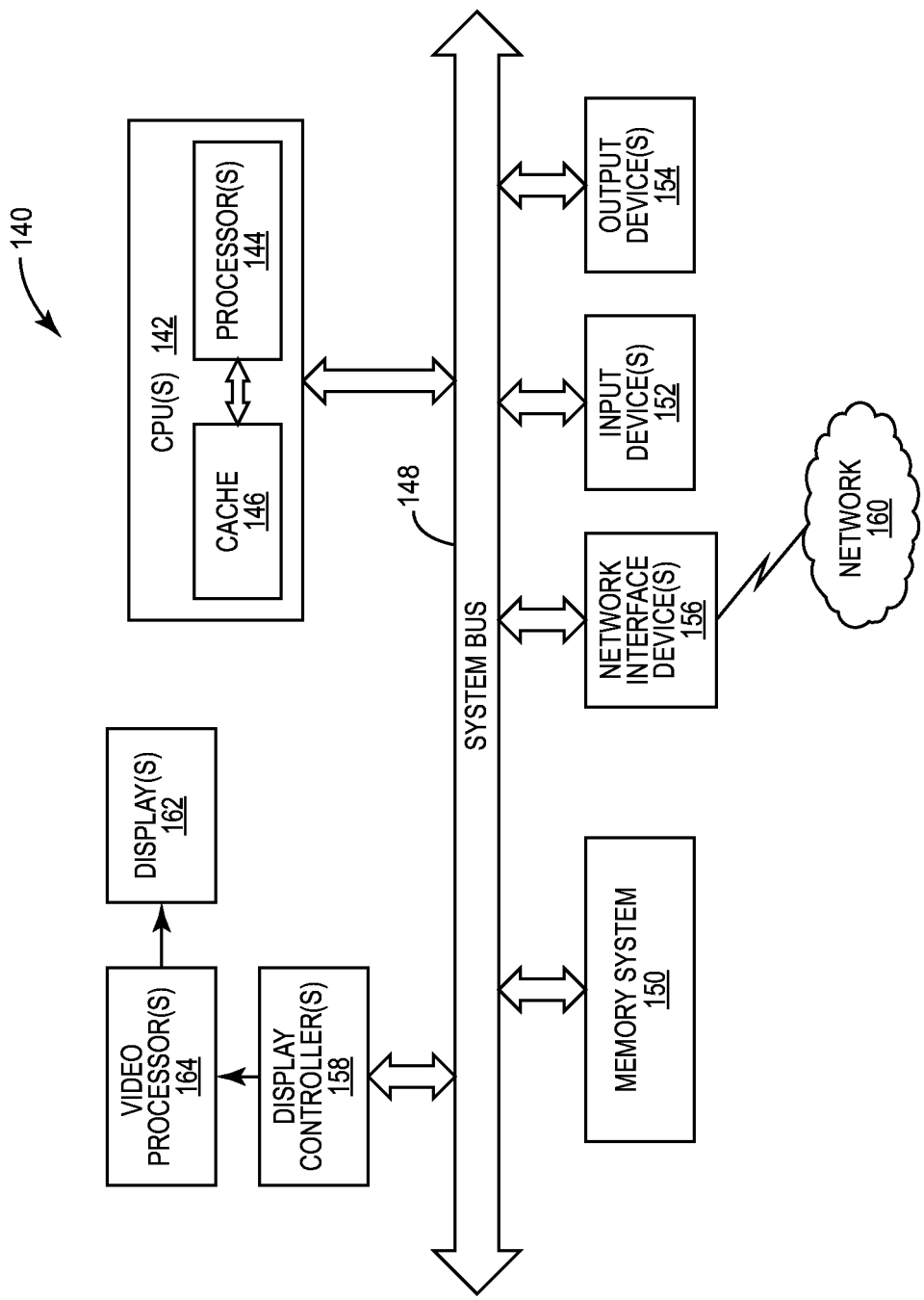
FIG. 6 is a block diagram of an exemplary processor-based system that can employ the host and device illustrated in FIG. 4.

In this regard, FIG. 6 illustrates an example of a processor-based system 140 that can employ the host 10' and device 12 illustrated in FIG. 4. In this example, the processor-based system 140 includes one or more central processing units (CPUs) 142, each including one or more processors 144. The CPU(s) 142 may be a master device and include the host 10'. The CPU(s) 142 may have cache memory 146 coupled to the processor(s) 144 for rapid access to temporarily stored data. The CPU(s) 142 is coupled to a system bus 148. As is well known, the CPU(s) 142 communicates with these other devices by exchanging address, control, and data information over the system bus 148. For example, the CPU(s) 142 can communicate bus transaction requests to a memory system 150 that may include the device 12. Although not illustrated in FIG. 6, multiple system buses 148 could be provided, wherein each system bus 148 constitutes a different fabric.

Other master and slave devices can be connected to the system bus 148. As illustrated in FIG. 6, these devices can include the memory system 150, which may have multiple memory units (not specifically illustrated), one or more input devices 152, one or more output devices 154, one or more network interface devices 156, and one or more display controllers 158, as examples. The input device(s) 152 can include any type of input device, including but not limited to input keys, switches, voice processors, etc. The output device(s) 154 can include any type of output device, including but not limited to audio, video, other visual indicators, etc. The network interface device(s) 156 can be any devices configured to allow exchange of data to and from a network 160. The network 160 can be any type of network, including but not limited to a wired or wireless network, a private or public network, a local area network (LAN), a wide local area network (WLAN), and the Internet. The network interface device(s) 156 can be configured to support any type of communication protocol desired.

The CPU(s) 142 may also be configured to access the display controller(s) 158 over the system bus 148 to control information sent to one or more displays 162. The display controller(s) 158 sends information to the display(s) 162 to be displayed via one or more video processors 164, which process the information to be displayed into a format suitable for the display(s) 162. The display(s) 162 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A universal flash storage (UFS) system comprising:
    a doorbell register having a number of bits corresponding to a UFS transfer protocol (UTP) Transfer Request List (UTRL);
    a completion notification register having a same number of bits; and
    a control system operatively coupled to the doorbell register and the completion notification register and configured to:
        set a doorbell bit in the doorbell register for a send request start;
        set a completion bit in the completion notification register on transfer request completion; and
        clear the doorbell bit on transfer request completion.

2. The UFS system of claim 1, wherein the control system is further configured to issue a transfer request to a device.

3. The UFS system of claim 2, wherein the send request start is associated with the transfer request.

4. The UFS system of claim 1, further comprising a communication interface configured to couple a host to a device.

5. The UFS system of claim 2, wherein the control system is further configured to clear the completion bit after processing completion of the transfer request.

6. The UFS system of claim 5, wherein the control system is further configured to reuse a slot associated with the completion bit after clearing the completion bit.

7. The UFS system of claim 2, wherein the transfer request includes a write command to write data to the device.

8. The UFS system of claim 2, wherein the transfer request includes a read command to read data from the device.

9. The UFS system of claim 1 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

10. A memory system comprising:
    a doorbell register having a number of bits;
    a completion register having a same number of bits; and
    a control system operatively coupled to the doorbell register and the completion register and configured to:
        set a doorbell bit in the doorbell register for a send request start;
        set a completion bit in the completion register on transfer request completion; and
        clear the doorbell bit on transfer request completion.

11. A method of controlling a memory system, comprising:
    generating a transfer request in a host;
    setting a bit in a doorbell register in the host identifying the transfer request;
    passing the transfer request to a device through a communication interface;
    completing a transfer associated with the transfer request;
    clearing the bit in the doorbell register; and
    setting a completion bit in a completion register.

12. The method of claim 11, wherein generating the transfer request comprises generating a read command to read data from the device.

13. The method of claim 11, wherein generating the transfer request comprises generating a write command to write data to the device.

14. The method of claim 11, further comprising starting the transfer.

15. The method of claim 11, further comprising handling interrupts to the transfer request without need for a software lock.

16. The method of claim 11, further comprising receiving an interrupt generated by a second transfer request.

17. The method of claim 11, further comprising clearing the completion bit after processing completion of the transfer request.

18. The method of claim 17, further comprising reusing a slot associated with the completion bit after clearing the completion bit.

19. An embedded Multi-Media Controller (eMMC) memory system comprising:
    a doorbell register having a number of bits corresponding to an eMMC Task Descriptor List (TDL);
    a completion notification register having a same number of bits; and
    a control system operatively coupled to the doorbell register and the completion notification register and configured to:
        set a doorbell bit in the doorbell register for a send request start;
        set a completion bit in the completion notification register on transfer request completion; and
        clear the doorbell bit on transfer request completion.

20. The eMMC memory system of claim 19, wherein the control system is further configured to issue a transfer request to a device.

21. The eMMC memory system of claim 20, wherein the send request start is associated with the transfer request.

22. The eMMC memory system of claim 19, further comprising a communication interface configured to couple a host to a device.

23. The eMMC memory system of claim 20, wherein the control system is further configured to clear the completion bit after processing completion of the transfer request.

24. The eMMC memory system of claim 23, wherein the control system is further configured to reuse a slot associated with the completion bit after clearing the completion bit.

25. The eMMC memory system of claim 20, wherein the transfer request includes a write command to write data to the device.

26. The eMMC memory system of claim 20, wherein the transfer request includes a read command to read data from the device.

* * * * *